Dec. 1, 1931.  P. E. HELMER ET AL  1,834,399
AUTOMATIC CONTROL FOR AIRCRAFT
Filed Sept. 2, 1930  5 Sheets-Sheet 1

Inventors
Philip E. Helmer
Edward J. Massicotte
By Clarence A. O'Brien
Attorney

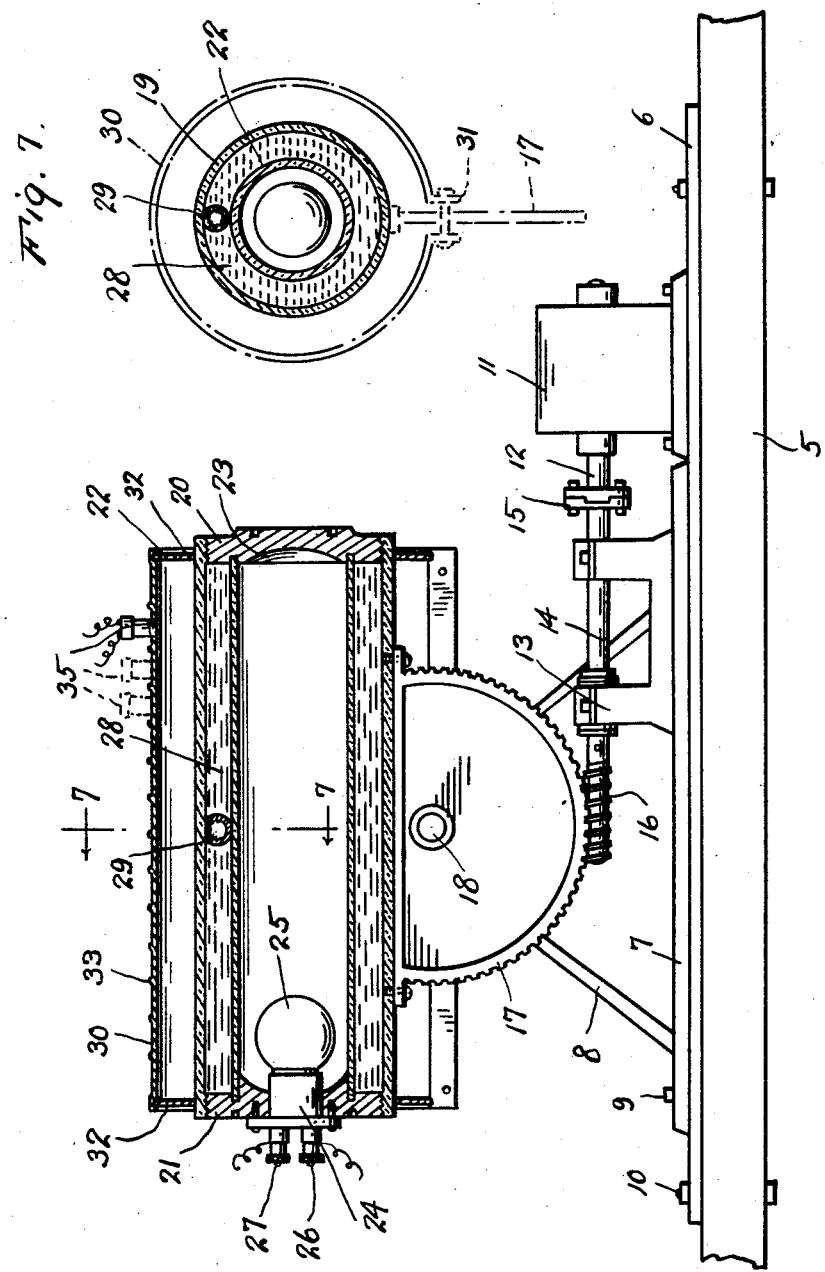

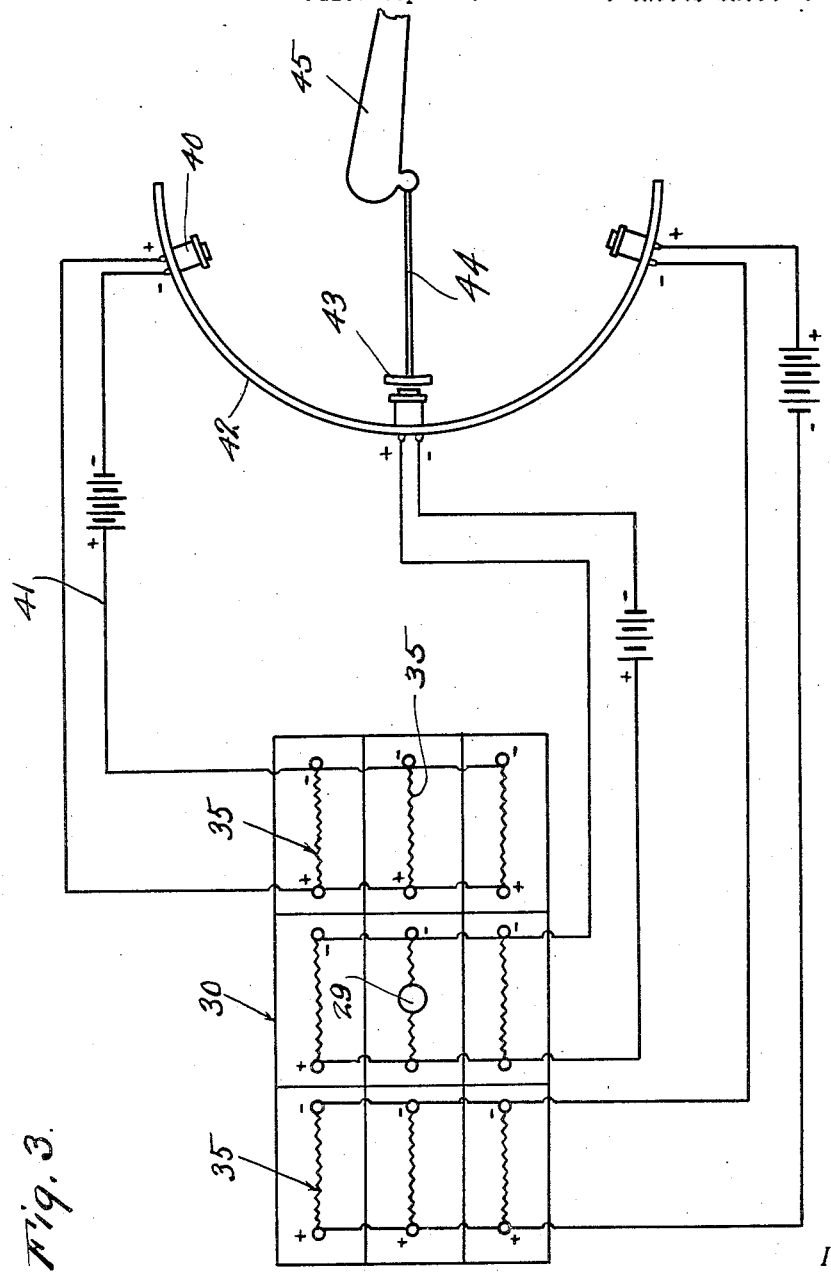

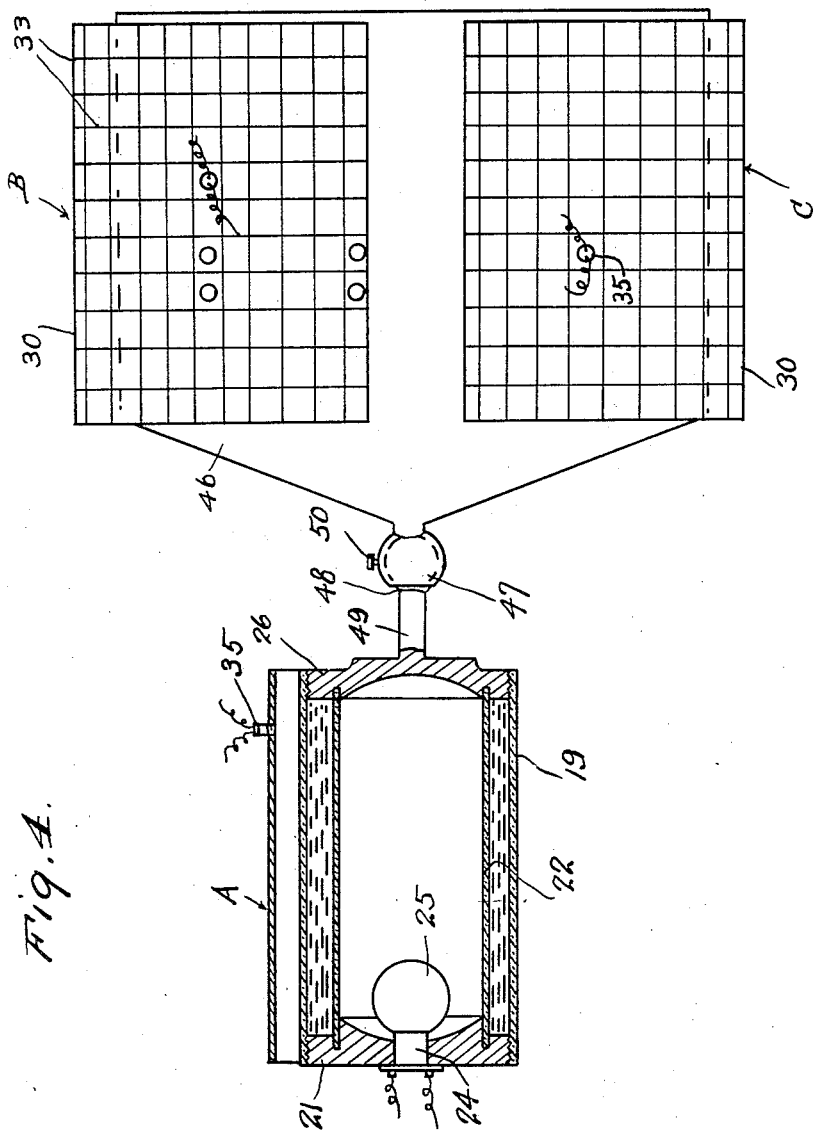

Dec. 1, 1931.  P. E. HELMER ET AL  1,834,399
AUTOMATIC CONTROL FOR AIRCRAFT
Filed Sept. 2, 1930  5 Sheets-Sheet 5
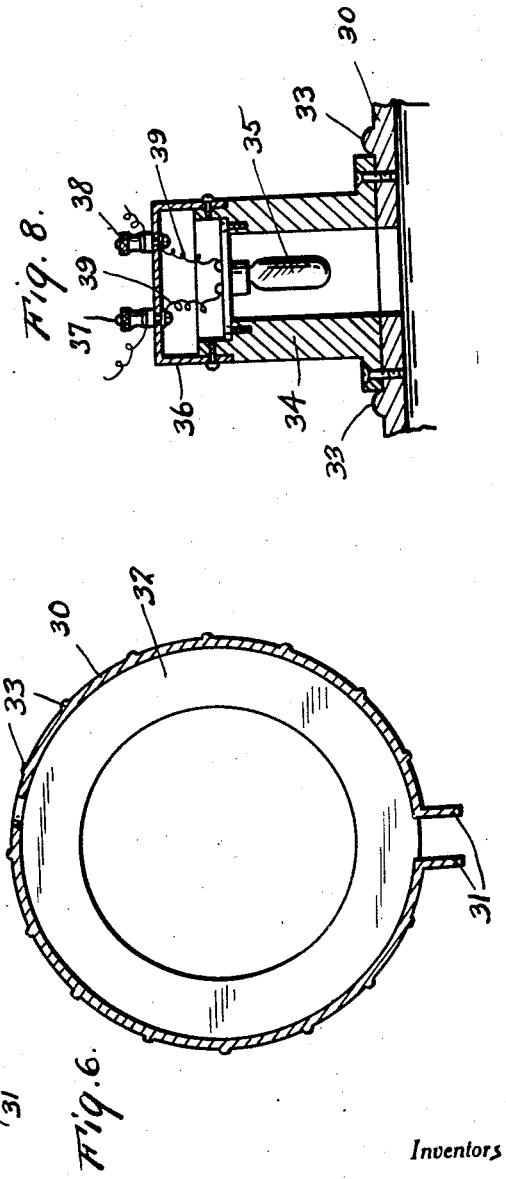
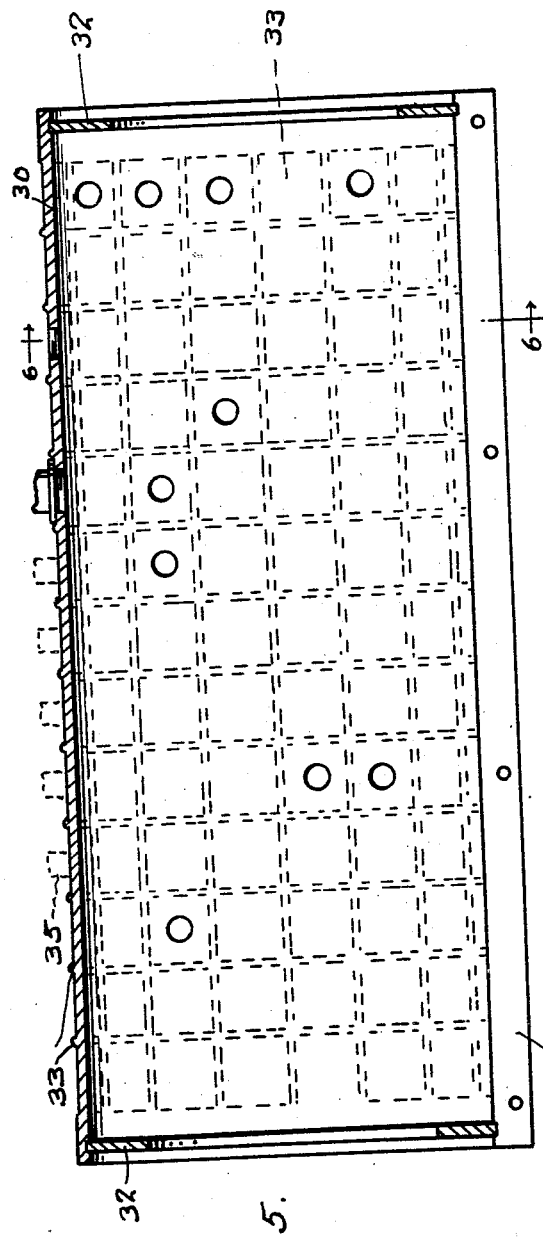
Inventors
Philip E. Helmer
Edward J. Massicotte
By Clarence A. O'Brien
Attorney Patented Dec. 1, 1931

1,834,399

UNITED STATES PATENT OFFICE

PHILIP E. HELMER AND EDWARD J. MASSICOTTE, OF PINCONNING, MICHIGAN

AUTOMATIC CONTROL FOR AIRCRAFT

Application filed September 2, 1930. Serial No. 479,328.

This invention relates to new and useful improvements in automatic controls for aircrafts.

The principal object of this invention is to provide an automatic aircraft control capable of being shut off when desired to permit manual control.

Another important object of the invention is to provide an automatic control for aircrafts wherein the various controlling compasses can be adjusted to permit preliminary setting.

These and other important objects and advantages of the invention will readily become apparent to the reader of the following specification.

In the drawings:—

Figure 2 represents the vertical sectional view through the apparatus for controlling the elevator of the aircraft.

Figure 3 represents a diagrammatic view disclosing the electrical connection between the selenium cells of the apparatus shown in Figure 2 and the electro-magnetic means for actuating the elevators.

Figure 4 represents a plan view partly in section disclosing the controlling factors for actuating the ailerons of the aircraft.

Figure 5 represents a longitudinal sectional view through the cell supporting jacket of the elevator control.

Figure 6 represents a cross sectional view through the jacket shown in Figure 5, taken substantially on line 6—6 of Figure 5.

Figure 7 represents a sectional view taken substantially on line 7—7 of Figure 2.

Figure 8 represents a vertical sectional view through one of the selenium cells.

Figure 1:
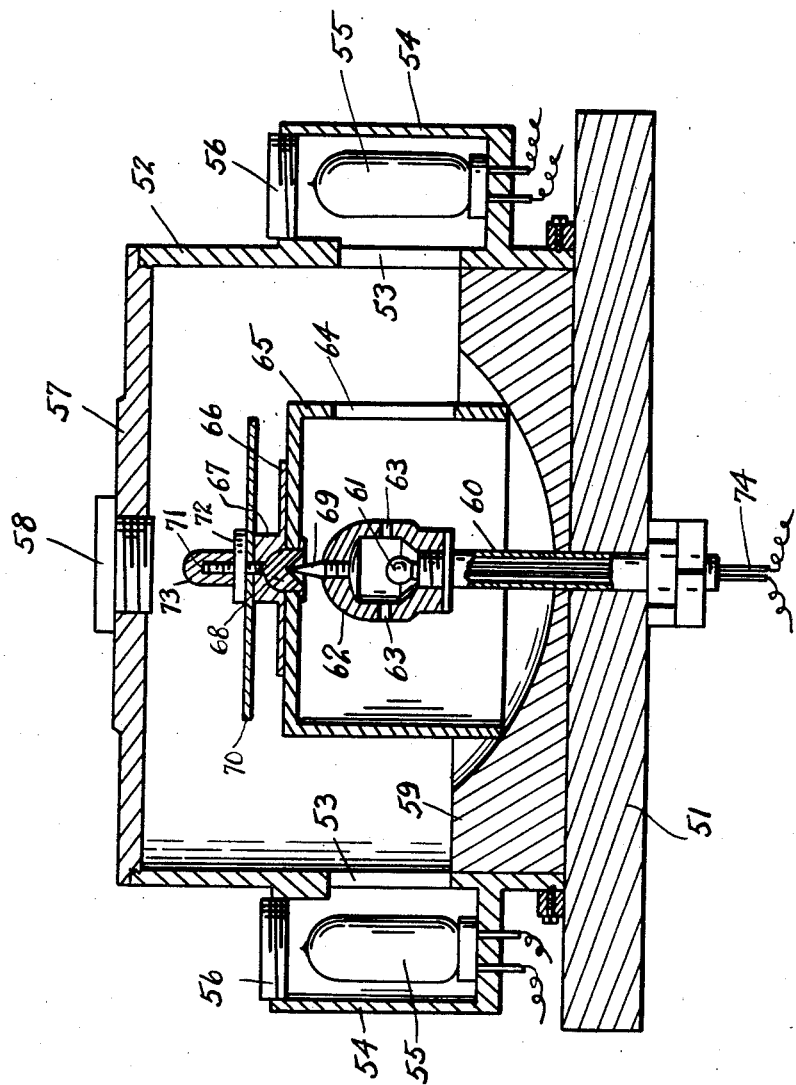
Figure 1 represents the vertical sectional view through the magnetic apparatus for controlling the compass direction of the aircraft.

Referring to the drawings wherein like numerals designate like parts, reference will be first made to the apparatus for controlling the elevators of the aircraft. This preferably includes a base 5 upon which is located a dielectric plate 6 for supporting the base 7 upon which the arbor 8 is secured by elements 9. The plate 6 is secured to the base 5 by suitable means 10 while located upon one end of the plate 6 is the electric motor 11, driving the armature shaft 12. A bearing member 13 supports the shaft 14 which is coupled to the armature shaft 12 as at 15. The opposite end of the shaft 14 being provided with a worm 16 meshing with the half gear 17 on the shaft 18 supported by the arbor 8.

Secured to the straight edge portion of the gear 17 is the transparent tube 19, internally threaded at each end to receive the plugs 20 and 21, each of which is provided with a circular groove at its inner side to receive the corresponding end of the transparent tube 22. The inner side of the plug 20 is supplied with a concave surface 23 while the opposite plug 21 has a socket 24 disposed therethrough for receiving a lamp bulb 25 provided with the binding posts 26—27. The space between the tube 22 and the tube 19 is filled with some suitable opaque liquid 28 in which the hollow transparent float 29 is floatable.

Surrounding the tube 19 and in spaced relation thereto is the jacket 30, split flanges as at 31—31. A collar or spacer 32 is interposed between each end of the jacket 30 and the corresponding end of the tube 19. The jacket 30 is divided into squares by circumferentially and longitudinally extending ribs 33 and within each square is an opening for registering with the lower open end of a shell 34. These shells 34 form housings for the selenium cells 35 and each of these shells is provided with a cap 36 at its upper end suitably secured thereto and provided with binding posts 37 and 38 from which wires 39 lead to the selenium cells 35. There is a selenium cell within each square of the jacket. In Figure 3 it can be seen that these selenium cells 35 are connected to corresponding electro-magnet 40 and are grouped in battery circuit 41, each including one of the aforementioned electro-magnets 40. These electro-magnets 40 are arranged on arcuate carrier 42 and are in electric magnetic relation to the shoe 43 on the arms 44 projecting from the elevators 45. Obviously when the tubes 19 and 22 are tilted, the float 29 will ride toward the line point in the liquid thus shifting the movement of the light through the float 29 from one selenium cell to another, obviously changing the inclination of the elevators to return the aircraft to the normal flying position.

Figure 4 discloses three separate factors such as shown in Figure 2. These being generally designated by A, B and C. These light sensitive devices are constructed in the same manner as the apparatus shown in Figure 2, with the exception that they are specially arranged for controlling the ailerons of the aircraft. The units B and C are on a platform 46 which is divided with a socket section 47 for receiving the head 48 on the arm 49 projecting from the unit A. A set screw 50 is provided to permit registration of the units together. Obviously, these points are connected to the separate ailerons and control the ailerons individually.

Figure 1 discloses the apparatus for controlling the rudder and consequently the compass direction of the aircraft. This apparatus includes a suitable base 51 upon which the vertically disposed hollow cylinder 52 is mounted, provided with longitudinally extending and circumferentially spaced slits 53 at predetermined spaced intervals. At the outer side of the cylinder 52 and at each slit 53 is a socket structure 54 for receiving a motor electric cell 55, the upper end of this socket being internally threaded to receive a threaded plug 56. The upper end of the cylinder 52 is closed by the lid 57 which has a threaded plug 58 therein.

Extending upwardly through the base 51 and through the concaved body 59 is the hollow post 60 provided with a socket at its upper externally threaded end to receive a lamp 61 which lamp is located within a box 62 having openings 63 therein registrable with a slit 64 and the dome structure 65. Compass graduations 66 are located on the top of the dome 65 and extending axially upwardly from the dome 65 is the hub structure 67 within which the recessed bearing 68 is located. The adjustable needle 60 extending upwardly from the shell 62 engages in the recess of the bearing 68 for supporting the dome 65. The numeral 70 represents the compass needle through which the threaded shank 71 on the bearing 68 extends. The washer 72 is interposed between the notch 73 on the threaded shank 71 and the needle 70.

Conductors 74 extend through the hollow post 60 from the lamp 61. Obviously as the aircraft shifts from its course the needle 70 will hold the dome 65 still while the cylinder 52 moves with the aircraft, thus bringing another slit 53 into registry with the slit 64 so that the light beam from the lamp 61 will strike another motor electric cell 55 to cause a compensating adjustment of the rudder. The rudder will be controlled in substantially the same manner as the elevator is shown controlled in Figure 3, that is, by pre-arranged electro-magnets in separate battery circuits.

It can be seen that the foregoing invention discloses a system for the automatic control of aircrafts which will be substantially foolproof and efficient in substantially all respects. While the foregoing specification sets forth the invention in specific terms, it is to be understood that numerous changes in the shape, size, and materials can be resorted to without departing from the spirit and scope of the invention as claimed herein, and it may be used for the purpose of automatic control of any other mechanical device.

Having thus described the invention, what is claimed as new is:—

1. An aircraft control including an elevator; a double walled tube structure, an opaque liquid interposed between the walls of the tubes, a transparent float in the liquid, selenium cells arranged around the tubes, electro-magnetic circuits including the selenium cells and electro-magnets in electric magnetic relation with the elevator.

2. An aircraft control including an elevator; a double walled tube structure, an opaque liquid interposed between the walls of the tubes, a transparent float in the liquid, selenium cells arranged around the tubes, electro-magnetic circuits including the selenium cells and electro-magnets in electric magnetic relation with the elevator, and means whereby the tube can be predeterminedly set.

3. An aircraft control including an elevator, a double walled tube structure, an opaque liquid interposed between the walls of the tube, a transparent float in the liquid, selenium cells arranged around the tube, electro-magnetic circuits including the selenium cells and electro-magnets in electric magnetic relation with the elevator, illuminating means within the tube and means whereby the selenium cells are mounted in spaced relation to the said tube.

4. Direction controlling means for aircrafts including a rudder, an electro-magnetic means for changing the position of the rudder, a compass apparatus, said compass apparatus including a lamp, a dome having a slit therein for normally concealing the lamp, said dome being held to a compass position, and an enclosure secured to move with the aircraft, said enclosure being provided with slits therein, and photo electric cells located on the outer side of the enclosure adjacent each of the slits, said photo electric cells being electrically connected with the electro-magnetic means adjacent the rudder.

In testimony whereof we affix our signatures.

PHILIP E. HELMER.
EDWARD J. MASSICOTTE.